United States Patent
Driver et al.

(10) Patent No.: US 9,839,502 B2
(45) Date of Patent: Dec. 12, 2017

(54) METHODS FOR ESTIMATING BIRTHING DATA FOR AN ANIMAL

(71) Applicant: PRECISION PASTORAL PTY LTD, Alice Springs, Northern Territory (AU)

(72) Inventors: Timothy Kenneth Driver, Alice Springs (AU); James Richard Hugh Christian, Alice Springs (AU)

(73) Assignee: PRECISION PASTORAL PTY LTD, Alice Springs, Northern Territory (AU)

( * ) Notice: Subject to any disclaimer, the term of this patent is extended or adjusted under 35 U.S.C. 154(b) by 19 days.

(21) Appl. No.: 14/762,738

(22) PCT Filed: Jan. 27, 2014

(86) PCT No.: PCT/AU2014/000041
§ 371 (c)(1),
(2) Date: Jul. 22, 2015

(87) PCT Pub. No.: WO2014/113842
PCT Pub. Date: Jul. 31, 2014

(65) Prior Publication Data
US 2015/0320535 A1    Nov. 12, 2015

(30) Foreign Application Priority Data
Jan. 25, 2013    (AU) .............................. 2013900249

(51) Int. Cl.
*A01K 29/00* (2006.01)
*G01G 17/08* (2006.01)
(Continued)

(52) U.S. Cl.
CPC .......... *A61D 17/008* (2013.01); *A01K 29/005* (2013.01); *G01G 17/08* (2013.01); *G01G 19/414* (2013.01)

(58) Field of Classification Search
CPC .... A01K 29/005; A61D 17/008; G01G 17/08; G01G 19/414
See application file for complete search history.

(56) References Cited

U.S. PATENT DOCUMENTS

| | | | | |
|---|---|---|---|---|
| 5,644,643 A | * | 7/1997 | Scofield | A01K 1/0613 119/840 |
| 6,838,625 B2 | * | 1/2005 | Ostermann | G01G 17/08 177/145 |

(Continued)

OTHER PUBLICATIONS

Guilbert, HR et al, Weight Records on Purebreds Beef Cattle during Growth, Gestation, and Lactation, Together with Data on Reproduction, Journal of Animal Science (1934) vol. 1, pp. 244-253 [online], [retrieved on Feb. 11, 2014]. Retrieved from the Internet URL : https://www.animalsciencepublications.org/publications/jas/pdfs/1934/1/JAN19340010244?search-result=1.

(Continued)

*Primary Examiner* — Randy Gibson
(74) *Attorney, Agent, or Firm* — David D. Brush; Westman Champlin & Koehler, P.A.

(57) ABSTRACT

Methods are provided for estimation of birthing data (such as birthing date and birthing weight) by consideration of a mother animal's weight over an expected birthing period. The method includes: measuring or providing the weight of the mother animal at intervals over an expected birthing period to provide a series of dated weight records, estimating the underlying weight of the mother animal over the expected birthing period from the series of dated weight records, and identifying a significant weight drop of the mother animal by reference to the estimated underlying weight, wherein the estimated birthing date is on or before the date of the significant weight drop. The methods are particularly useful in animals associated with production, such as cattle.

13 Claims, 6 Drawing Sheets

(51) Int. Cl.
*G01G 19/414* (2006.01)
*A61D 17/00* (2006.01)

(56) References Cited

U.S. PATENT DOCUMENTS

| | | | | |
|---|---|---|---|---|
| 7,129,423 B2* | 10/2006 | Baarsch | ............... | A01K 1/0023 |
| | | | | 119/842 |
| 7,406,927 B2* | 8/2008 | Baarsch | ............... | A01K 1/0023 |
| | | | | 119/842 |
| 2008/0125670 A1* | 5/2008 | Signorini | ............. | A01K 29/005 |
| | | | | 600/551 |
| 2008/0128486 A1 | 6/2008 | Lowe | | |
| 2009/0018778 A1 | 1/2009 | Nation et al. | | |
| 2010/0331739 A1 | 12/2010 | Maltz et al. | | |
| 2011/0161125 A1* | 6/2011 | Pratt | ................... | A01K 1/0023 |
| | | | | 705/7.11 |

OTHER PUBLICATIONS

International Search Report dated Mar. 5, 2014, for corresponding International Patent Application PCT/AU2014/000041, filed Jan. 25, 2014.
Written Opinion of the International Searching Authority dated Mar. 5, 2014, for corresponding International Patent Application PCT/AU2014/000041, filed Jan. 27, 2014.

* cited by examiner

METHODS FOR ESTIMATING BIRTHING DATA FOR AN ANIMAL

CROSS REFERENCE TO RELATED APPLICATIONS

The present application is based on and claims the benefit of: Australian provisional patent application Serial No. 2013900249, filed Jan. 25, 2013, the content of which is hereby incorporated by reference in its entirety.

The present application is a Section 371 National Stage Application of International Application No. PCT/AU2014/000041, filed Jan. 27, 2014, which is incorporated by reference in its entirety and published as WO 2014/113842 A1 on Jul. 31, 2014, in English.

FIELD OF THE INVENTION

The present invention relates to the field of animal management and breeding. In particular, the invention relates to methods for estimating the date on which an animal gives birth, this information being useful in management of the animal or its progeny.

BACKGROUND TO THE INVENTION

Modern genetic breeding techniques rely on the capture of accurate data for each animal in a population. For example, cattle producers all over the world utilise the recording system known as "BreedPlan" which is a modern genetic evaluation system for beef cattle. BreedPlan calculates the estimation of an animal's genetic worth for a wide range of production traits. The results are reported as estimated breeding values (EBVs) as an estimate of the animal's true breeding value. BreedPlan can also report estimates of animals' true breeding values as estimated progeny differences (EPDs) to conform to reporting conventions in some countries. EBVs for economically important traits currently being produced include fertility (scrotal size, days to calving), birth (gestation length, calving ease), weight (birth weight, milk, 200, 400 and 600 day growth, mature cow weight), carcase (weight, eye muscle area, fat depth, retail beef yield, intramuscular fat, shear force), and others such as docility, net feed intake, structural soundness and flight time.

Gestation Length EBVs are important estimates of genetic differences between animals in the number of days from the date of conception until the calf birth date. These EBVs are estimated from the joining and birth date records for calves conceived by artificial insemination or hand mating. The analysis accounts for differences in the "maternal" effect of dams on the gestation length. The accuracy of Gestation length EBVs depend on accurate birthing date data being obtained.

Calving Ease EBVs are estimates of genetic differences between animals in the ability of their daughters to give birth without assistance. The EBVs are reported as differences in the percentage unassisted calvings. Accurate Calving Ease EBVs may rely in part on accurate progeny birth weight data.

Currently, individual cattle data required are collected manually, either in the cattle yards or paddock, at a large expense to the producers and their animals. The producer has an increased workload, placing an extra strain on their current work plans or requiring more staff, and animal production is effected due to the extra handlings required to collect the data.

The traditional way of collecting this information is for the producer to physically identify and catch newborn calves. This activity of catching calves has been estimated to cost the producer around $10 per head.

Apart from the significant cost, these manual methods are prone to error. For example, birth date require on constant and diligent monitoring of pregnant animals (which is sometimes impossible) and accurate weighing of newborn animals (which is difficult given the less than ideal conditions under which weighing takes place). The inclusion of inaccurate raw data can cause significant inaccuracies in EBVs reported by systems such as BreedPlan.

It is an aspect of the present invention to provide improved methods for estimating birth date and birth weight for an animal.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, the present method provides a method for determining an estimated birthing date of a mother animal, the method comprising the steps of: measuring or providing the weight of the mother animal at intervals over an expected birthing period to provide a series of dated weight records, estimating the underlying weight of the mother animal over the expected birthing period from the series of dated weight records, and identifying a significant weight drop of the mother animal by reference to the estimated underlying weight, wherein the estimated birthing date is on or before the date of the significant weight drop.

In one embodiment of the method, the step of estimating the underlying weight comprises the step of transforming the series of dated weight records into: a first data series, being weight data smoothed over a period preceding a putative birthing date, a second data series being weight data smoothed over a period following the putative birthing date wherein the estimated birthing date is the putative birthing date where a significant quantitative difference in weight exists between the first and second data series at the putative birthing date.

The identification of a significant quantitative difference in weight may involve a comparison of quantitative differences in weight over a number of putative dates of birthing. A significant quantitative difference may be considered the largest difference in weight when data series of all putative dates of birthing are considered.

In one embodiment the data is smoothed by using an average or a median of a series of the dated weight values.

In another aspect there is provided a method for determining an estimated birthing date of a mother animal, the method comprising the steps of: measuring or providing the weight of the mother animal at intervals over an expected birthing period to provide a series of dated weight records, and for or each dated weight record: calculating an average_preceding_weight value, being the average weight of the mother animal over the at least n records (or at least x days) preceding the date of the dated weight record, calculating an average_following_weight value, being the average weight of the mother animal over the following at least n records following the date of the dated weight record, calculating an average_weight_difference, being the difference in average_preceding_weight and average_following_weight, identifying the dated record which exhibits the greatest average_weight_difference value, wherein the estimated birthing date is the date of the dated record which exhibits the greatest average_weight_difference value. In one embodiment the value of n is greater than about 5 and less than about 20.

The method may comprise the step of calculating an absolute_weight_drop value, being the difference in weight of the mother animal on the estimated birthing date and the weight of the mother animal of the dated weight record preceding the estimated birthing date, wherein greater certainty in the estimated birthing date is provided where absolute_weight_drop is greater than a minimum expected weight drop at birth.

In another embodiment the method may comprising the step of calculating a relative_weight_drop value, being the actual_weight_drop divided by the weight of the mother animal of the dated weight record preceding the estimated birthing date, wherein greater certainty in the estimated birthing date is provided where relative_weight_drop value is greater than about 0.04 and/or less than about 0.12

The method may further comprise the step of comparing the relative_weight_drop of the estimated birthing date, with the relative weight drops of other date over the expected calving period, wherein greater certainty in the estimated birthing date is provided where relative_weight_drop of the estimated birthing date is greater than for any other date.

In one embodiment the method includes the step of comparing the absolute_weight_drop of the estimated birthing date, with the absolute_weight_drop of other dates over the expected calving period, wherein greater certainty in the estimated birthing date is provided where absolute_weight_drop of the estimated birthing date is greater than for any other date.

In another aspect the invention provides a method for estimating the birth weight of a progeny animal, the method comprising the steps of: determining an estimated birthing date by the method as described herein, calculating the weight lost by the mother animal on, or about the estimated birthing date, wherein the estimate birth weight is the weight lost by the mother animal, and optionally applying an adjustment factor. The method may further comprise the steps of calculating an absolute_weight_drop or a relative_weight_drop value according to the method of claim 6 or claim 7, and optionally applying an adjustment factor.

DETAILED DESCRIPTION OF THE INVENTION

Figure 1:
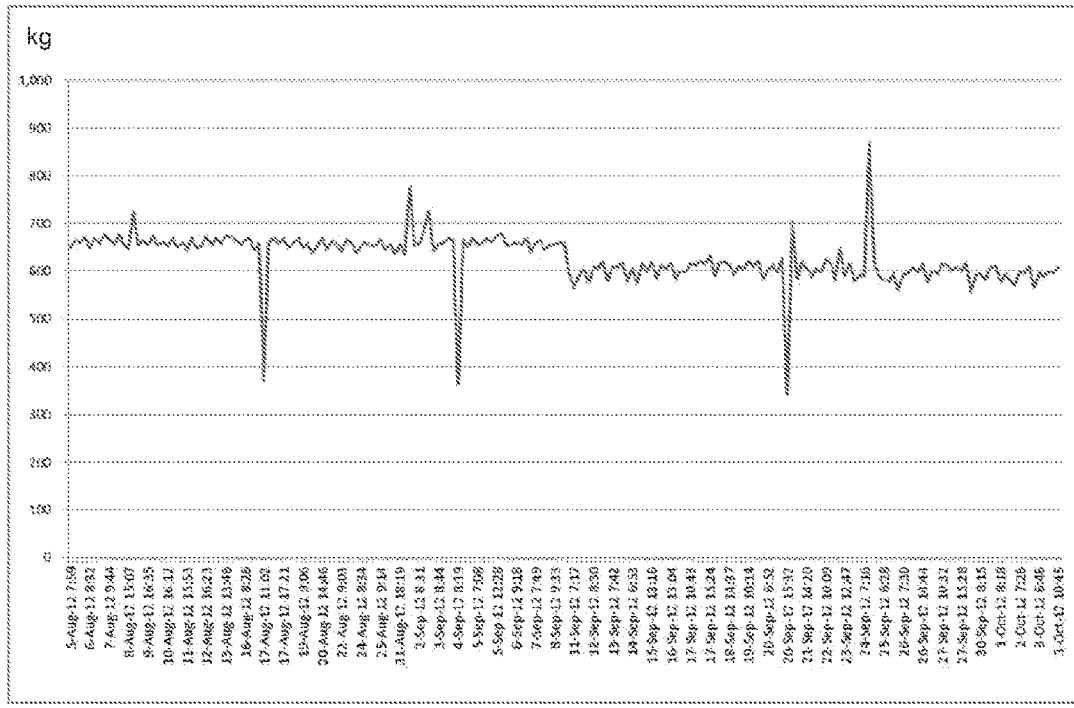
FIG. 1 is a graph showing raw live weight of a cow over a period when the animal is expected to calve.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects may apply only to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" medians that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

The present invention is predicted at least in part on the Applicant's discovery that birthing date in an animal (i.e. the date on which an animal is estimated to have given birth) may be estimated by the analysis of a series of historical weight measurements of the mother animal. A significant reduction in weight from a first point in time to a second point in time is indicative that the animal has given birth at some point between the two time points.

However, where the animal is weighed at long intervals, it will be appreciated that considerable doubt may exist as to the birthing date. For example, where weight is measured weekly, a significant drop in weight indicates only that the animal has given birth on any day of the preceding week.

In a first aspect the present invention provides a method for determining an estimated birthing date of a mother animal, the method comprising the steps of:
    measuring or providing the weight of the mother animal at intervals over an expected birthing period to provide a series of dated weight records,
    estimating the underlying weight of the mother animal over the expected birthing period from the series of dated weight records, and.
    identifying a significant weight drop of the mother animal by reference to the estimated underlying weight,
wherein the estimated birthing date is on or before the date of the significant weight drop.

Applicant proposes that identification of weight drop due to a birthing event (and therefore estimation of the date of birth) is improved whereby a consideration of the mother animal's underlying weight is included. As used herein, the term "underlying weight" is intended to mean that part of the animal's total weight which does not fluctuate significantly as a result of material ingested by the animal (such as food and water) or material excreted (such as urine and faeces).

Estimation of the animal's underlying weight can be by any suitable method that directly or indirectly takes into account any factor that leads to fluctuation of the animal's weight due to a non-birthing event. For example, measurements may be taken of food and water ingested by the animal, and also urine and faces excreted. While feasible and useful, such methods may be impractical in certain circumstances such as larger commercial cattle farms.

As an alternative, historical weight data of the animal may be analysed to estimate the animal's underlying weight. In one embodiment, the underlying weight may be estimated by transforming the series of dated weight records into: a first data series, being weight data smoothed over a period preceding a putative birthing date, a second data series being weight data smoothed over a period following the putative birthing date. Analysis of the first and second data series (where there is a birthing event) will show a divergence indicating a change in the underlying weight in the mother animal, that change being due to the birth of the progeny animal and expulsion of the placenta and other birthing-associated tissues. Accordingly, the estimated birthing date is the putative birthing date where a significant quantitative difference in weight exists between the first and second data series at the putative birthing date.

It is proposed that the use of two smoothed data series about a putative birthing date provide significant improvement in the accuracy of an estimated birthing date. The smoothing of weight fluctuations in the pre- and post-birthing period, and the identification of a significant difference between the two series allows for the identification of an estimated birthing date.

Reference is made to FIG. 1 which shows a weight data series for a single cow over a 2 month period. In that period, the animal is expected to calve. However, the information graphed on FIG. 1 is not sufficient to ascribe an estimated birthing date. Considering the weight record, it is clear the data includes many variations, and there would be some difficulty in interpretation. The ability to estimate birthing date is even more difficult where less complete weight data series are available.

Figure 2:
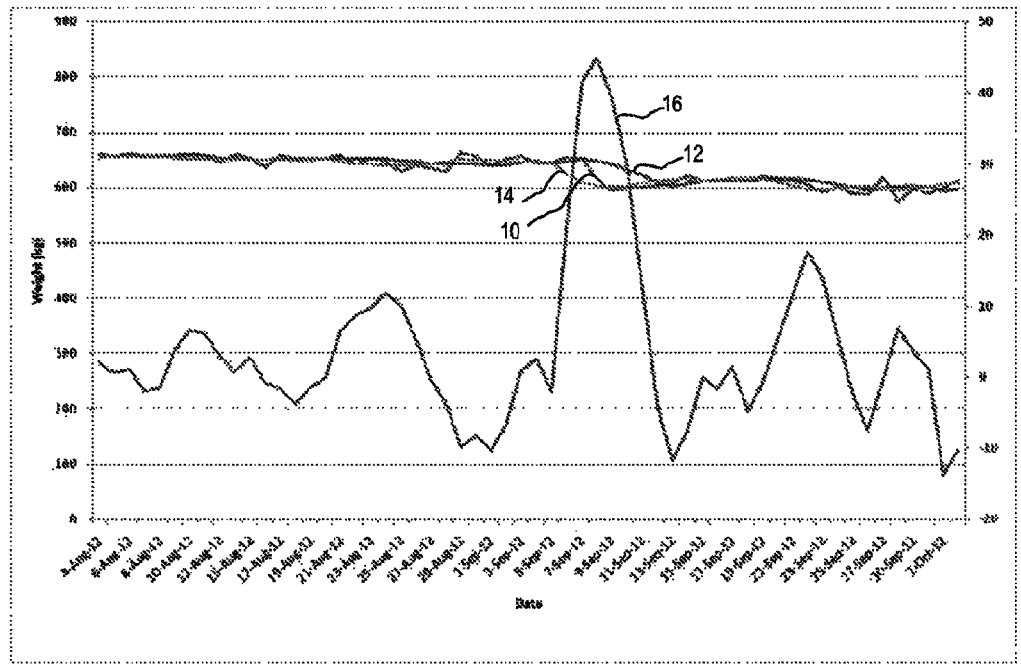
FIG. 2 is a graph plotting rolling averages of the live weight of a cow over a period when the animal is expected to calve. The left axis shows weight of the animal in kg. The lower graph shows the differences in rolling averages, the right hand axis showing the difference in kg.

Reference is now made to FIG. 2 which shows smoothed weight data for the single cow subject of FIG. 1 over an expected calving period for two data series. The measured weight of the animal is shown by line 10. The data series shown as line 12 is a rolling average for 15 weight records preceding a putative birthing date. The data series shown as line 14 is a rolling average of the 15 weight records following a putative birthing date. The line 16 is the difference (in weight) between the data series of line 12 and line 14. It will be noted that a sharp peak of over 40 kg difference is formed, the peak occurring at the estimated birthing date. It will be noted that several other peaks in the line 16 may be discerned, but it is the highest peak (i.e. the day of the greatest difference between the two smoothed data series 12 and 14) which defines the estimated birth date.

Accordingly, in one embodiment of the method the identification of a significant quantitative difference in weight involves a comparison of quantitative differences in weight over a number of putative dates of birthing.

In some circumstances, where a significant peak is noted for multiple putative birthing dates, the putative date having the peak of greatest magnitude is taken as the estimate birthing date. Thus, in one embodiment of the method a significant difference is considered the largest quantitative difference in weight when data series of all putative dates of birthing are considered.

As discussed above, the data may be smoothed by averaging a series of the dated weight values. Other smoothing methods may be used, and in some embodiments greater accuracy is provided by the use of a median of a series of the dated weight values, or by reference to a recently validated weight value (such as a manually recorded weight).

The data may be smoothed over a predetermined number of dated weights records, or over a predetermined period of time. Preferably, the dated weight records are taken at regular intervals and so this distinction is immaterial to the operation of the method.

In one embodiment, the smoothing utilizes at least 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 dated weight records. In a preferred embodiment, the smoothing utilizes about 14 or 15 records. As a minimum it has been demonstrated that a minimum of 14 prenatal and 14 postnatal weights were required for results of an acceptable accuracy to be produced.

In one embodiment, the smoothing utilizes dated weight records taken over at least 2, 3, 4, 5, 6, 7, 8, 9, 10, 11, 12, 13, 14, 15, 16, 17, 18, 19, 20, 21, 22, 23, 24, 25, 26, 27, 28, 29 or 30, 31, 32, 33, 34, 35, 36, 37, 38, 39, 40, 41, 42, 43, 44, 45, 46, 47, 48, 49, or 50 days for each of the prenatal period and postnatal period. It has been observed that a minimum period of time to collect records (and preferably at least 14 or 15 pre- and postnatal records), is 30 days prior to calving and 30 days post calving. However greater amounts of pre- and postnatal data may lead to more accurate estimates.

In one embodiment, the number of days or the number records is the same for the first data series or the second data series, however in some cases the numbers may be different. For example, if the weight was measured more frequently before the putative birthing date (i.e. the first data series) then more records may be required for the weights recorded after the putative birthing date (i.e. the second data series), and vice-versa.

The dated weight records of the series may be taken at any substantially regular interval, including intervals of about 1, 2, 3, 4, 5, 6, 7, 8, 9, or 10 days. It has been found that accurate birthing dates are possible on weight records taken at weekly intervals. Indeed, the ability to ascribe accurate birthing dates using weight records taken at infrequent intervals is an advantage of the present methods.

The skilled person understands that in many circumstances it will be difficult to ensure that all animals in a herd will walk over a weighing platform at a regular interval much less at a defined interval. The methods of the present invention are intended to handle weight records taken at irregular or undefined intervals. In many cases an accurate birthing date is still able to be ascribed.

The present methods may be described by reference to the calculations required in order to determine an estimated birthing date. Such calculations may be used in the generation of graphical material such as that shown in FIG. 2, or may be utilized directly. Accordingly, in another aspect the present invention provides a method for determining an estimated birthing date of a mother animal, the method comprising the steps of: measuring or providing the weight of the mother animal at intervals over an expected birthing period to provide a series of dated weight records, and for or each dated weight record: calculating an average_preceding_weight value, being the average weight of the mother animal over the at least n records (or at least x days) preceding the date of the dated weight record, calculating an average_following_weight value, being the average weight of the mother animal over the following at least n records (or at least x days) following the date of the dated weight record, calculating an average_weight_difference, being the difference in average_preceding_weight and average_following_weight, identifying the dated record which exhibits the greatest average_weight_difference value, wherein the estimated birthing date is the date of the dated record exhibits the greatest average_weight_difference value.

In some embodiments, more accurate estimates are provided where medians are used and so the present invention provides a method for determining an estimated birthing date of a mother animal, the method comprising the steps of: measuring or providing the weight of the mother animal at intervals over an expected birthing period to provide a series of dated weight records, and for or each dated weight record: calculating a median_preceding_weight value, being the median weight of the mother animal over the at least n records (or at least x days) preceding the date of the dated weight record, calculating a median_following_weight value, being the median weight of the mother animal over the following at least n records (or at least x days) following the date of the dated weight record, calculating an median_weight_difference, being the difference in median_preceding_weight and median_following_weight, identifying the dated record which exhibits the greatest median_weight_difference value, wherein the estimated birthing date is the date of the dated record exhibits the greatest median_weight_difference value.

The data may be averaged or the median taken over a predetermined number of dated weights records, or over a predetermined period of time. Preferably, the dated weight records are taken at regular intervals and so this distinction is immaterial to the operation of the method.

In one embodiment, the data is averaged or the median taken over at least 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 dated weight records. In a preferred embodiment, the data is averaged or the median taken over about 14 or 15 records for each of preceding weight and following weight.

In one embodiment, the data is averaged of the median taken over at least 1, 2, 3, 4, 5, 6, 7, 8, 9, 10, 11, 12, 13, 14, 15, 16, 17, 18, 19, 20, 21, 22, 23, 24, 25, 26, 27, 28, 29 30, 31, 32, 33, 34, 35, 36, 37, 38, 39, 40, 41, 42, 43, 44, 45, 46, 47, 48, 49, or 50 days. In one embodiment the data is averaged or the mean taken over at least 30 days for each of the preceding weight or the following weight.

In one embodiment, the number of days or the number records is the same for the first data series or the second data series, however in some cases the numbers may be different.

The dated weight records of the series may be taken at any substantially regular interval, including intervals of about 1, 2, 3, 4, 5, 6, 7, 8, 9, or 10 days.

In one embodiment the method comprises the step of calculating a relative_weight_drop value, being the actual_weight_drop divided by the weight of the mother animal of the dated weight record preceding the estimated birthing date, wherein greater certainty in the estimated birthing date is provided where relative_weight_drop value is greater than about 0.01 and/or less than about 0.2. In one embodiment the relative_weight_drop value is greater than about 0.01 and/or less than about 0.2, preferably greater than about 0.02 and/or less than about 0.18, more preferably greater than about 0.03 and/or less than about 0.16, yet more preferably greater than about 0.04 and/or less than about 0.14. Most preferably the relative_weight_drop value greater than about 0.04 and/or less than about 0.12.

As used herein, the term "greater certainty" is intended to mean greater relative to the level of certainty provided where the further criteria is satisfied. With reference to the immediately preceding embodiment, the further criteria is the relative_weight_drop value is between about 0.04 and 0.12. The greater certainty may be shown by, for example, comparing the estimated birthing date with the actual birthing date in the course of validation studies of the type which the skilled artisan is capable of executing.

In one embodiment, the method comprises the step of calculating an absolute_weight_drop value, being the difference in weight of the mother animal on the estimated birthing date and the weight of the mother animal of a dated weight record preceding the estimated birthing date, or an average or median weight of the mother animal of a series of dated weight record preceding the estimated birthing date, wherein greater certainty in the estimated birthing date is provided where absolute_weight_drop is greater that a minimum expected weight drop at birth. A 15 kg calf typically registers as a 25 kg weight drop in the mother. A 10 kg calf typically records a 16 kg change in the mother. Very small calves are sometimes born, even as low as 5.5 kg registering as about 10 kg drop in the mother's weight. Thus, the expected minimum expected weight drop for a cow is in some embodiments is from about 10 kg to about 24 kg. In larger breeds of cattle the weight drop is greater, and may be around 45 kg in some circumstances.

In one embodiment the method comprises comparing the relative_weight_drop of the estimated birthing date, with the relative weight drops of other dates over the expected calving period, wherein greater certainty in the estimated birthing date is provided where relative_weight_drop of the estimated birthing date is greater than for any other date.

One embodiment of the method comprises the step of comparing the absolute_weight_drop of the estimated birthing date, with the absolute_weight_drop of other dates over the expected calving period, wherein greater certainty in the estimated birthing date is provided where absolute_weight_drop of the estimated birthing date is greater than for any other date.

The present methods for estimating birth weight may be modified or adapted to limit the number of false positives (i.e. estimated birth dates where no birth occurred). Further, the means by which dated weight data is collected may be specified to limit false positives.

False positives may be caused by a weight loss event triggered by animal handling or management practice, and not a birth event. For example, when cattle are handled or mustered, animals experience a weight loss associated with the mustering event which can mimic a birth event.

False positives may result from significant swings in weight (both positive and negative) caused by varying gut fill (and particularly from water intake). It has been observed that large swings in gut fill due to larger or smaller intakes of water or feed can trigger a false positive. This can be influenced by environment, management practices or cattle's social interaction.

The environmental influence may relate to temperature, with hot and cold days dictating the amount of water and or feed and animal consumes, effecting gut fill and potentially causing a false positive.

Management practices can influence gut fill such as mustering, adding an additional feed source or nutrient supplementation. All can have an effect gull fill and potentially cause a false positive.

Social interaction can have an effect on gut fill also with an animal being bullied away from water until the dominant animal exits the area. This also can result in a false positive, because the animal may leave the trough without water gut fill potentially causing a false positive.

Accordingly, the present methods may compromise the step of providing a subset of a dated weight series, the subset having weight data removed that is known, predicted or suspected to be influenced (directly or indirectly) by a non-birthing event. Only the data subset is subsequently used for any determination of birth date.

Figure 5:
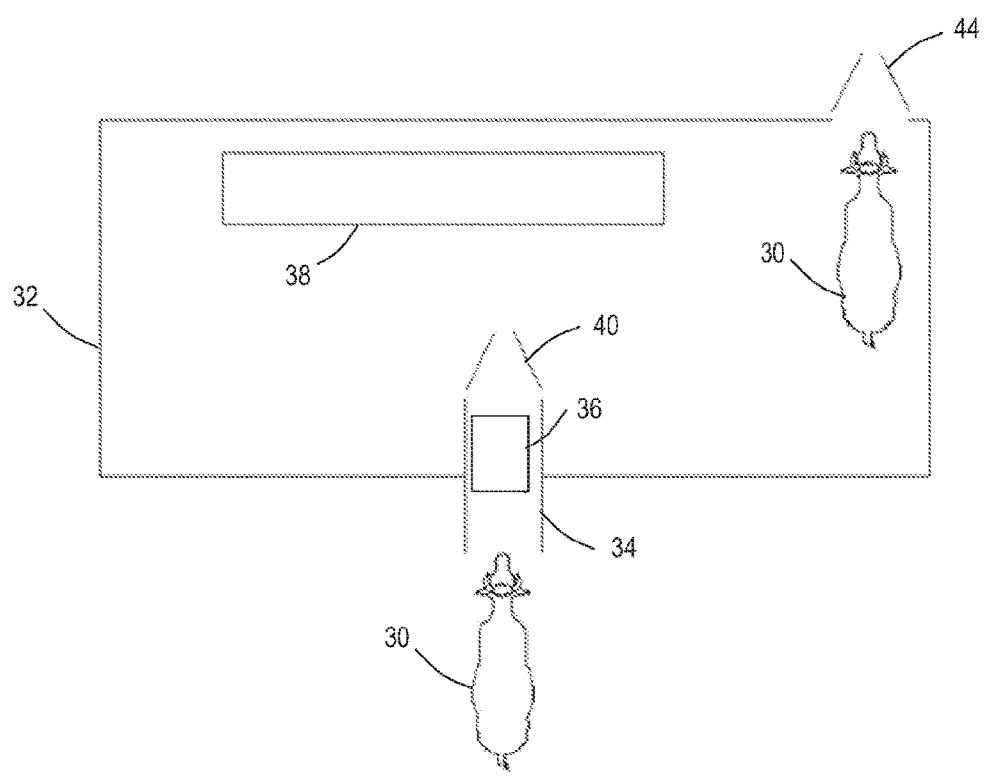
FIG. 5 is a diagram of the weighing arrangement described in Example 2.

In some embodiments of the present methods, the weight data is collected in a specified manner to limit the effect of non-birthing events on the estimated birthing date. For example, the effect of gut fill can be counteracted to at least some extent by ensuring that the animal is weighed only on the way to a water trough. For example, a water trough may be placed in a yard, the yard having an entry only point and an exit only point, a weighing platform being disposed about the entry only point, the trough being positioned such that the animal must pass the water trough in order to access the exit only point. An exemplary arrangement is shown at FIG. 5. By this arrangement, the animal is weighed once only, and weighed before drinking. This produces less erratic weights in the data set allowing the algorithm to more effectively identify false positives.

Figure 6:
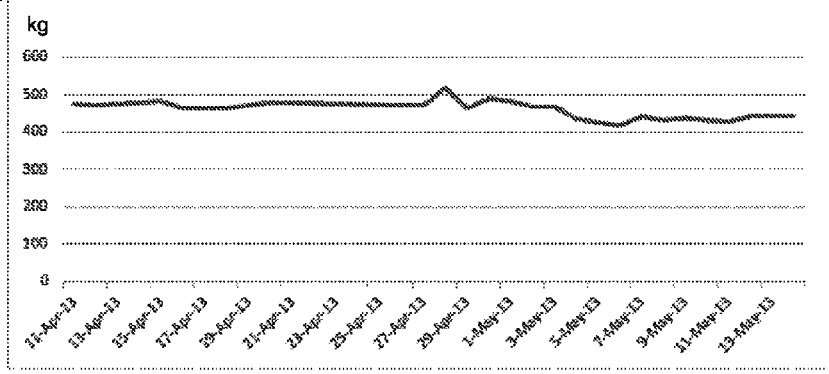
FIG. 6a is a graph showing the weight of a cow when weight data was obtained by the weighing arrangement of Example 1.
FIG. 6b is a graph showing the weight of a cow when weight data was obtained by the weighing arrangement of Example 2.
Figure 6:
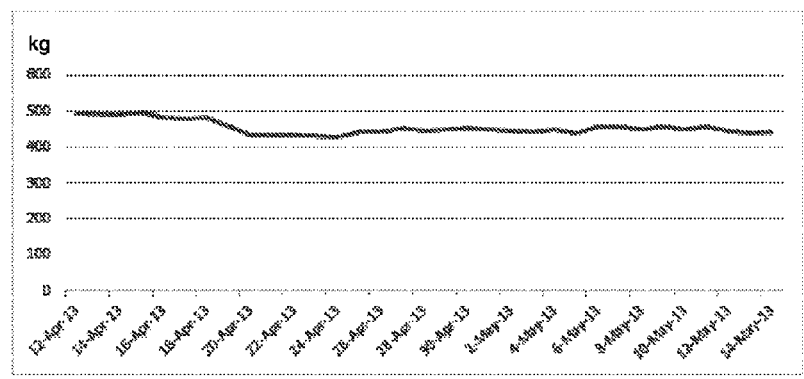

Reference is made to FIG. 6 which demonstrates the more consistent weight data series obtained when an animal is weighed only on the way to water (Panel A) compared with the situation where weight is measured both before and after water (Panel B).

In another aspect, the present invention provides a method for estimating the birth weight of a progeny animal the method comprising the steps of determining an estimated birthing date by a method as described herein, calculating the weight lost by the mother animal on, or about the estimated birthing date, and optionally applying an adjustment factor.

The birth weight of the progeny animal may calculated by evaluating the actual or percentage drop of the mother animal's live body weight, whilst also taking into account the final weight before birth. As an example for cows, a 600 kg cow may register a 50 kg weight drop at birth, this indicating a 30 kg calf (5% of the mother's weight before birth). A 400 kg cow may register a 50 kg weight drop indicating a 30 kg calf (7% of the mother's weight before birth.

Alternatively, the birth weight may be estimated by reference only to the absolute_weight_drop or the relative_weight_drop value (or similar value) as calculated according to the methods described herein. According, the present method further provides a method for estimating the birth weight of a progeny animal the method comprising the steps of calculating an absolute_weight_drop or a relative_weight_drop value according to the methods described herein, and optionally applying an adjustment factor.

Reference is made to the following documents which describe methods for the estimation of calf birth weight by reference to the mother's weight. Silvey, M. W. and Haydock, K. P. (1978). *A note on live-weight adjustments for pregnancy in cows*. Animal Production 27, 113-116; O'Rourke, P. K., Entwistle, K. W., Arman, C., Esdale, C. R., and Burns, B. M. (1991). *Fetal development and gestational changes in Bostaurus and Bosindicus genotypes in the tropics*. Theriogenology, 36, 839-853. The present methods provide greater accuracy of these prior art methods given the accuracy of the estimated birthing date provided by the present methods.

Greater accuracy in birth weights may be achieved whereby the mother's weight immediately birth (which is used as the basis for calculating the weight drop) does not include (or is unlikely to include) excess weight due to an intake of water into the gut.

It is proposed that significant variations in weight result from the mother animal drinking. As an example, an animal may enter the watering yard and passes over the scales, with a weight 360 kg being recorded. As the animal exits the watering yard, after drinking, she passes over the scales, which records a weight of 400 kg. The extra weight (40 kg) is due to the amount of water consumed by the animal, and in some embodiments of the method is adjusted for.

If the mother has consumed a volume of water just before the last weighing before birth, then the calculated weight drop will be higher than would be the case where no water was just taken. Accordingly, the birth weight will be over-estimated. In some instances the weight drop attributable to calving may be masked, leading to an incorrect estimated birth date being ascribed. It will be appreciated that weight fluctuations caused by water consumption may lead to greater errors in estimating birth date and birth weight in smaller calves.

Figure 3:
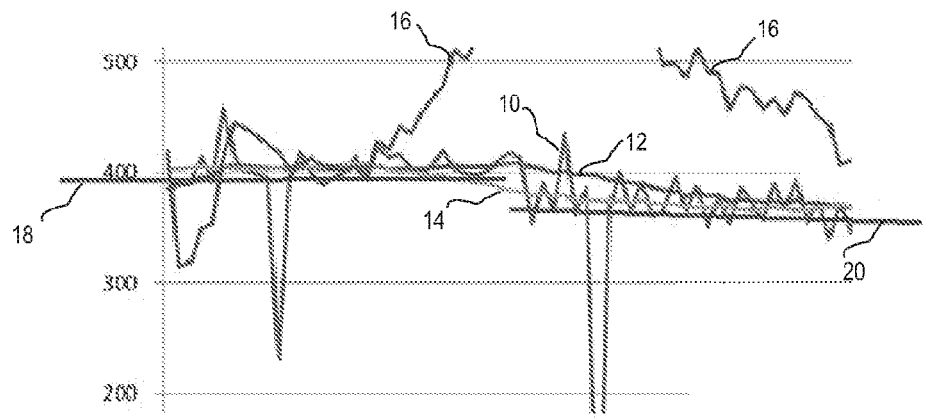
FIG. 3 is a graph plotting rolling averages of the live weight of a cow over a period when the animal is expected to calve. In this case, the mother regularly consumes water, and a small calve is born.

FIG. 3 shows a date weight record series, with data series lines being numbered in a manner consistent with FIG. 2. The measured weight line 10 demonstrates regular spikes of a size roughly that of a water intake. The average prenatal weight of the animal, the weight taken before water intake is shown at 18. The average postnatal weight of the animal, the weight taken before water intake is shown at 20. It will be seen that the after water weight can replace the calf's weight drop, however embodiments of the method that ignore the after water weights may lead to more accurate estimates.

Accordingly, where it is apparent that the weight record taken immediately prior to birth is likely to include a significant volume of water, then that record may be discarded, and the immediately previous record used instead to calculate birthing weight of the progeny.

In some embodiments of the methods, some dated weight data is discarded (i.e. not included in any estimation of birthing date or birth weight). This discounting of some data may be necessary to account for any error of flaw in an automatic weighing system. For example, weights which are physically impossible (i.e. unrealistically high or low) or are far removed from a recently validated weight (for example ascertained statically, or taken manually) are discarded.

As another example, for each animal each record may be compared to its surrounding 15 records and discarded if it is <about 79% of the average weight of the surrounding 15 records; or it is >about 121% of the average weight of the surrounding records Validation checks may also be made to ensure that all dated weight records are identified as being obtained from a single animal.

The present methods may be implemented practically in any one or more of a number of ways. For example, the animal's weight may be measured with the intervention of a human being, such that the animal is placed on a scale and the weight manually recorded and subsequently entered into a database. While manual methods are clearly operable, automated methods are preferred. Typically, the animals in a population present themselves to a cattle race, and (one-by-one) onto a weighing platform which automatically records the weight. Radio frequency identification tag on the animal is generally read during weighing so that the weight can be correctly ascribed to a certain animal.

The automatically collected and identified weight data may be transmitted to a computer, the computer comprising software configured to execute a method of the present invention.

The present methods may be advantageously executed by a computer, operable at least in part or even entirely on any processor-equipped device such as a personal computer, laptop, netbook, tablet, PDA, smart phone and other similar contrivances. The method may be implemented on a single computer or across multiple computers connected to a LAN, WAN or the Internet. The method may be implemented in the form of standalone software adapted to be installed on a single computer.

Thus, another aspect of the present invention therefore provides computer hardware and/or computer software configured to execute a method as described herein. The ability to automate the entire weighing and data analysis will allow for a producer to more efficiently manage a population of animals. Computer-based methods also provide for the ability to minimise operational costs.

In a further aspect the present invention provides a computer-readable memory containing processor executable program instructions for executing a method as described herein. The program instructions may comprise the steps of calculating any one of more of the following values:
average_preceding_weight
average_following_weight
average_weight_difference
relative_weight_drop
absolute_weight_drop In a further aspect the invention provides a system for deriving a plurality of indicators, related to a sudden decrease in the mass of an animal, the system comprising:
(i) a method of sampling against known absolute or elapsed time a plurality of input signals with at least one related to weight and a one related to a unique animal identifier at a distributed but apriori unspecified set of times,
(ii) a method of first filtering said input signals to determine an estimate of the animals underlying mass at desired sampling intervals,
(iii) a method of second filtering to determine the indicators related to identify a potential likelihood of a sudden drop in mass at various points in time and,
using the output of the first filtering at times prior to and after the time of highest potential likelihood of a drop in mass and deriving a plurality of indicators related to the potential event The weight may be obtained from load cells of a walk over weighing arrangement.

The animal may have an Identifier, which may be stored and received from RFID tag Two of the plurality of indicators may be birth date and birth weight The first filtering may involve the use of models to reduce uncertainty due to oral intake and natural excrement.

The second filtering may involve a forward and/or reverse moving average.

The second filtering may involve a forward and/or reverse median filter

The second filtering may involve a Markov estimator with appropriately set apriori state transition probabilities and observation model.

Those of skill in the art will appreciate that the various embodiments disclosed herein can be implemented as electronic hardware, computer software, or combinations of both.

To clearly illustrate this interchangeability of hardware and software, various illustrative components and steps of the method have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions is for ease of description.

The various embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of any method or calculation described herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an application specific integrated circuit (ASIC).

Various embodiments may also be implemented primarily in hardware using, for example, components such as ASICs, or field programmable gate arrays ("FPGAs"). Implementation of a hardware state machine capable of performing the functions described herein will also be apparent to those skilled in the relevant art. Various embodiments may also be implemented using a combination of both hardware and software.

While this description refers to application of the methods to cattle, it will be appreciated that the present invention is applicable to other animals. Animals of agricultural or economic importance for which the present methods may have applicability include alpaca, buffalo, banteng, camel, goat, gayal, horse, llama, pig, sheep, yak and zebu. The invention may also be applicable to zoo animals which may be difficult to monitor and/or weigh. The invention may be further applicable to wild animals subject to scientific research.

The present invention will be now more fully described by reference to the following non limiting example.

EXAMPLES

Example 1: Validation Study in Cattle at Research Station

A total of 27 Droughtmaster cows due to give birth were regularly weighed over an experimental period of 5 months. Each cow was fitted with an RFID tag. A set of dated weight records were obtained for all mother animals.

Figure 4:
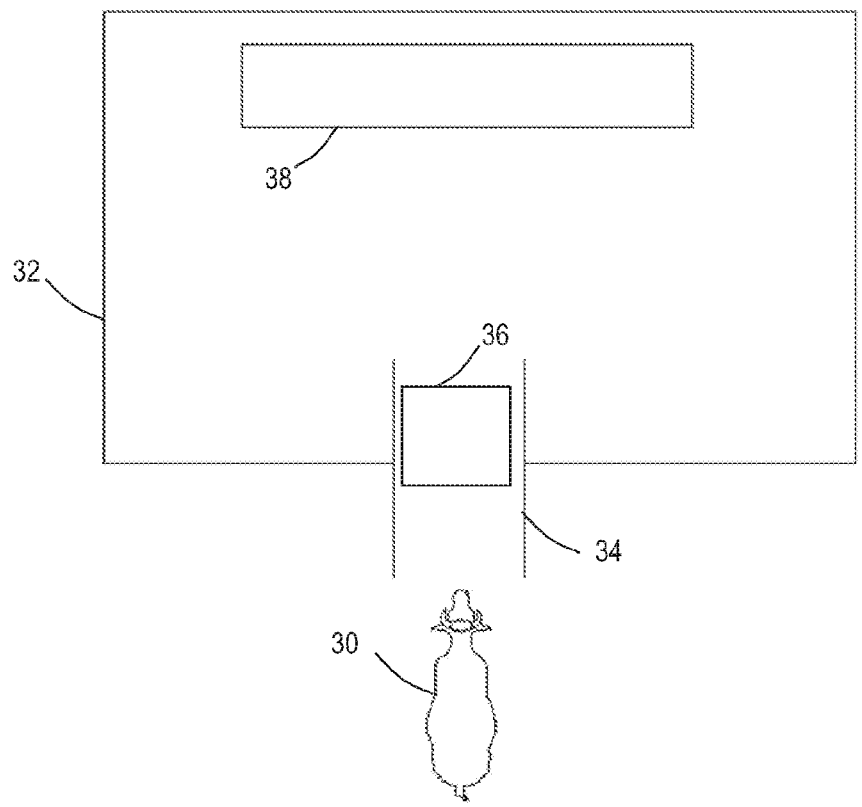
FIG. 4 is a diagram of the weighing arrangement described in Example 1.

Mother animals were tagged with an RFID device, and allowed to roam freely. Reference is made to FIG. 4 which shows the watering and weighing arrangement utilized. A watering trough 38 was located inside a fenced area 32, with a single point of entry and exit 34. An automatic weighing platform 36 (as part of a Remote Livestock Management System) was placed in the point of entry and exit 34. As animals pass over the platform 34 on their way to the water trough 38, their RFID tag and weight is recorded, along with a date and time stamp. Other attractants can be used such as feed or supplement, also other methods of funnelling animals thought the scales such as spear traps may be used.

During the experimental period the cows were monitored intensively by an observer to identify the actual date of birth, and to also manually weigh the calf. Given the small herd size and the strict experimental conditions under which this Example was conducted, the confidence that the date of birth recorded by the observer is the true date of birth is high.

At the conclusion of the experiment, the data series for each animal was analysed to provide an estimated date of birth as follows:
1. Records with 0 kg weight were discarded.
2. Remaining weights were analysed for suitability on a per animal basis:
(a). Each record was compared to its surrounding 15 records (where applicable), and was kept if:
  (i). the record was >79% of the average weight of the surrounding 15 records; and
  (ii). the record was <121% of the average weight of the surrounding records
(b). Discarded records were re-analysed and re-included on a per animal basis if:
  (i) the record was >79% of the average weight; and
  (ii) the record was <121% of the average weight.
(c). Records are verified by comparison to known static weights on a per animal basis if those static weights are available.
3. Calculations were performed on a per record basis on data for:
(a). Average daily weight
(b). Average weight for the preceding 15 records
(c). Average weight for the following 15 records
(d). The difference in the preceding and following weights [(preceding 15)−(following 15)]
4. The calving date was determined where the following criteria were met:
(a). The EID being assessed belonged to an entire female
(b). The most significant record for [(preceding 15)−(following 15)] satisfied one or both of:
  (i). between 4 and 12% of the preceding weight of the cow
  (ii). greater than 24 kg
(c). The weight and/or percentage from b above is the largest record for that animal within the expected calving period At the conclusion of the experiment, the data series for each animal was analysed to provide an estimated birth weight. Birth weight was calculated as 61% of the live weight drop of the mother animal, by reference to the birth date as estimated supra.

Table 1 (below) summarises all data, including a comparison of actual birth dates and birth weights with those estimated by methods according to the present invention.

TABLE 1

Summary of Validation Trial Data (Research Station)

| Cow ID | Calf Gender | Actual DOB | Actual Birth Weight (kg) | Estimated Weight Drop (kg) | Estimated DOB | DOB Variance (days) | Est. Birth Weight (kg) | Birth Weight Variance (kg) |
|---|---|---|---|---|---|---|---|---|
| 001 | F | 19/08/2012 | 30 | 49 | 20/08/2012 | 1 | 30 | −0.01 |
| 002 | F | 23/08/2012 | 22 | 29 | 22/08/2012 | −1 | 18 | −3.57 |
| 003 | M | 9/09/2012 | 32 | 57 | 10/09/2012 | 1 | 35 | 2.96 |
| 004 | M | 14/08/2012 | 31 | 37 | 12/08/2012 | −2 | 23 | −7.78 |
| 005 | M | 8/09/2012 | 35 | 46 | 8/09/2012 | 0 | 28 | −6.14 |
| 006 | M | 20/08/2012 | 46 | 56 | 19/08/2012 | −1 | 34 | −12.02 |
| 007 | F | 17/08/2012 | 29 | 54 | 17/08/2012 | 0 | 33 | 3.85 |
| 008 | F | 13/08/2012 | 31 | 54 | 15/08/2012 | 2 | 33 | 2.29 |
| 009 | M | 6/09/2012 | 34 | 59 | 6/09/2012 | 0 | 36 | 1.77 |
| 010 | M | 22/08/2012 | 31 | 53 | 22/08/2012 | 0 | 33 | 2.15 |
| 011 | M | 28/08/2012 | 28 | 39 | 27/08/2012 | −1 | 24 | −3.51 |
| 012 | M | 9/09/2012 | 37 | 68 | 8/09/2012 | −1 | 41 | 4.98 |
| 013 | F | 17/08/2012 | 38 | 68 | 17/08/2012 | 0 | 41 | 3.79 |
| 014 | M | 15/08/2012 | 28 | 45 | 16/08/2012 | 1 | 27 | −0.62 |
| 015 | M | 17/09/2012 | 34 | 51 | 16/09/2012 | −1 | 31 | −2.96 |
| 016 | F | 16/08/2012 | 27 | 51 | 16/08/2012 | 0 | 31 | 4.37 |
| 017 | M | 31/08/2012 | 39 | 49 | 30/08/2012 | −1 | 30 | −8.95 |
| 018 | M | 12/09/2012 | 37 | 78 | 13/09/2012 | 1 | 47 | 10.91 |
| 019 | F | 17/08/2012 | 23 | 48 | 18/08/2012 | 1 | 29 | 6.81 |
| 020 | F | 21/08/2012 | 29 | 34 | 17/08/2012 | −4 | 21 | −8.06 |
| 021 | M | 31/08/2012 | 39 | 60 | 30/08/2012 | −1 | 37 | −2.41 |
| 022 | F | 17/08/2012 | 30 | 52 | 18/08/2012 | 1 | 32 | 2.44 |
| 023 | F | 20/08/2012 | 22 | 32 | 20/08/2012 | 0 | 20 | −2.36 |
| 024 | F | 19/08/2012 | 26 | 49 | 20/08/2012 | 1 | 30 | 4.64 |
| 025 | F | 2/09/2012 | 25 | 24 | 29/08/2012 | −4 | 14 | −10.61 |

TABLE 1-continued

Summary of Validation Trial Data (Research Station)

| Cow ID | Calf Gender | Actual DOB | Actual Birth Weight (kg) | Estimated Weight Drop (kg) | Estimated DOB | DOB Variance (days) | Est. Birth Weight (kg) | Birth Weight Variance (kg) |
|---|---|---|---|---|---|---|---|---|
| 026 | M | 31/08/2012 | 33 | 53 | 1/09/2012 | 1 | 32 | −0.15 |
| 027 | F | 18/08/2012 | 17 | 30 | 17/08/2012 | −1 | 18 | 1.05 |

Variance between actual and estimated date of birth was found to be very low, with an average of about 1 day noted. Variance between actual and estimated birth weight was found to be about 82%.

Example 2: Validation Study in Cattle at Commercial Station

This Example was carried out under less stringent conditions than those of Example 1. A larger number of animals were involved and the ability to check each animal daily for calving was compromised on some occasions. Accordingly, the results presented in Table 2 refer to an "observed date of birth" which may be different to the actual date of birth.

The watering and weighing used in this Example is shown in FIG. 5, which is numbered in accordance with the arrangement of FIG. 4. Different to FIG. 4, the fenced watering area 32 has an entry point 34 having a one-way gate 40 preventing the animal from returning to the weighing platform 36. Instead, the animal must exit via an exit only gate 44.

The algorithm used in this Example was identical to that of Example 1 with the exception that weights were smoothed by taking a median rather than the average.

The data at Table 2 shows the number of prenatal and postnatal dated weight records used in the estimation algorithm

TABLE 2

Summary of Validation Trial Data (Commercial Station)

| Cow ID | Observed DOB | No. Prenatal Records | No. Postnatal Records | Estimated DOB | DOB Variance (Days) |
|---|---|---|---|---|---|
| 100 | 14 Apr. 2013 | 4 | 23 | 20 Apr. 2013 | −6 |
| 101 | 25 Apr. 2013 | 9 | 16 | 29 Apr. 2013 | −4 |
| 102 | 22 Apr. 2013 | 7 | 19 | 26 Apr. 2013 | −4 |
| 103 | 22 Apr. 2013 | 7 | 21 | 25 Apr. 2013 | −3 |
| 104 | 23 Apr. 2013 | 10 | 19 | 26 Apr. 2013 | −3 |
| 105 | 26 Apr. 2013 | 11 | 18 | 29 Apr. 2013 | −3 |
| 106 | 17 Apr. 2013 | 6 | 23 | 20 Apr. 2013 | −3 |
| 107 | 24 Apr. 2013 | 9 | 16 | 27 Apr. 2013 | −3 |
| 108 | 1 May 2013 | 16 | 13 | 4 May 2013 | −3 |
| 109 | 30 Apr. 2013 | 15 | 12 | 3 May 2013 | −3 |
| 110 | 29 Apr. 2013 | 14 | 15 | 1 May 2013 | −2 |
| 111 | 22 Apr. 2013 | 10 | 19 | 24 Apr. 2013 | −2 |
| 112 | 5 May 2013 | 23 | 9 | 7 May 2013 | −2 |
| 113 | 24 Apr. 2013 | 6 | 18 | 26 Apr. 2013 | −2 |
| 114 | 27 Apr. 2013 | 11 | 13 | 28 Apr. 2013 | −1 |
| 115 | 29 Apr. 2013 | 12 | 14 | 30 Apr. 2013 | −1 |
| 116 | 26 Apr. 2013 | 11 | 16 | 27 Apr. 2013 | −1 |
| 117 | 2 May 2013 | 17 | 12 | 3 May 2013 | −1 |
| 118 | 22 Apr. 2013 | 11 | 21 | 23 Apr. 2013 | −1 |
| 119 | 2 May 2013 | 15 | 11 | 3 May 2013 | −1 |
| 120 | 27 Apr. 2013 | 12 | 16 | 28 Apr. 2013 | −1 |
| 121 | 14 Apr. 2013 | 5 | 25 | 15 Apr. 2013 | −1 |
| 122 | 29 Apr. 2013 | 15 | 14 | 29 Apr. 2013 | 0 |
| 123 | 2 May 2013 | 12 | 10 | 2 May 2013 | 0 |
| 124 | 1 May 2013 | 16 | 12 | 1 May 2013 | 0 |
| 125 | 27 Apr. 2013 | 12 | 17 | 27 Apr. 2013 | 0 |
| 126 | 29 Apr. 2013 | 14 | 14 | 29 Apr. 2013 | 0 |
| 127 | 2 May 2013 | 17 | 11 | 2 May 2013 | 0 |
| 128 | 7 May 2013 | 20 | 8 | 7 May 2013 | 0 |
| 129 | 25 Apr. 2013 | 10 | 15 | 25 Apr. 2013 | 0 |
| 130 | 17 Apr. 2013 | 8 | 22 | 17 Apr. 2013 | 0 |
| 131 | 1 May 2013 | 16 | 12 | 1 May 2013 | 0 |
| 132 | 6 May 2013 | 15 | 8 | 6 May 2013 | 0 |
| 133 | 18 Apr. 2013 | 8 | 21 | 18 Apr. 2013 | 0 |
| 134 | 29 Apr. 2013 | 12 | 14 | 29 Apr. 2013 | 0 |
| 135 | 17 Apr. 2013 | 8 | 22 | 17 Apr. 2013 | 0 |
| 136 | 1 May 2013 | 13 | 13 | 1 May 2013 | 0 |
| 137 | 6 May 2013 | 21 | 8 | 6 May 2013 | 0 |
| 138 | 29 Apr. 2013 | 15 | 14 | 29 Apr. 2013 | 0 |
| 139 | 6 May 2013 | 23 | 8 | 6 May 2013 | 0 |
| 140 | 6 May 2013 | 21 | 8 | 6 May 2013 | 0 |
| 141 | 3 May 2013 | 17 | 8 | 3 May 2013 | 0 |
| 142 | 5 May 2013 | 18 | 9 | 5 May 2013 | 0 |
| 143 | 2 May 2013 | 15 | 12 | 2 May 2013 | 0 |
| 144 | 7 May 2013 | 19 | 6 | 7 May 2013 | 0 |
| 145 | 26 Apr. 2013 | 12 | 17 | 25 Apr. 2013 | 1 |
| 146 | 29 Apr. 2013 | 12 | 14 | 28 Apr. 2013 | 1 |
| 147 | 30 Apr. 2013 | 17 | 13 | 29 Apr. 2013 | 1 |
| 148 | 30 Apr. 2013 | 13 | 14 | 29 Apr. 2013 | 1 |
| 149 | 26 Apr. 2013 | 10 | 17 | 25 Apr. 2013 | 1 |
| 150 | 19 Apr. 2013 | 9 | 21 | 18 Apr. 2013 | 1 |
| 151 | 1 May 2013 | 18 | 12 | 30 Apr. 2013 | 1 |
| 152 | 1 May 2013 | 13 | 13 | 30 Apr. 2013 | 1 |
| 153 | 25 Apr. 2013 | 10 | 17 | 24 Apr. 2013 | 1 |
| 154 | 4 May 2013 | 17 | 9 | 3 May 2013 | 1 |
| 155 | 21 Apr. 2013 | 10 | 20 | 19 Apr. 2013 | 2 |
| 156 | 3 May 2013 | 18 | 10 | 1 May 2013 | 2 |
| 157 | 29 Apr. 2013 | 10 | 13 | 27 Apr. 2013 | 2 |
| 158 | 6 May 2013 | 23 | 8 | 4 May 2013 | 2 |
| 159 | 5 May 2013 | 15 | 9 | 3 May 2013 | 2 |
| 160 | 26 Apr. 2013 | 10 | 16 | 24 Apr. 2013 | 2 |
| 161 | 6 May 2013 | 15 | 8 | 4 May 2013 | 2 |
| 162 | 5 May 2013 | 18 | 8 | 3 May 2013 | 2 |
| 163 | 28 Apr. 2013 | 14 | 15 | 26 Apr. 2013 | 2 |
| 164 | 30 Apr. 2013 | 15 | 13 | 28 Apr. 2013 | 2 |
| 165 | 9 May 2013 | 22 | 5 | 6 May 2013 | 3 |
| 166 | 28 Apr. 2013 | 14 | 15 | 25 Apr. 2013 | 3 |
| 167 | 8 May 2013 | 19 | 6 | 5 May 2013 | 3 |
| 168 | 25 Apr. 2013 | 11 | 16 | 22 Apr. 2013 | 3 |
| 169 | 11 May 2013 | 24 | 3 | 8 May 2013 | 3 |
| 170 | 11 May 2013 | 20 | 3 | 7 May 2013 | 4 |
| 171 | 26 Apr. 2013 | 12 | 18 | 22 Apr. 2013 | 4 |
| 172 | 10 May 2013 | 18 | 5 | 5 May 2013 | 5 |
| 173 | 7 May 2013 | 22 | 7 | 2 May 2013 | 5 |
| 174 | 1 May 2013 | 14 | 11 | 25 Apr. 2013 | 6 |
| 175 | 23 Apr. 2013 | 9 | 21 | 16 Apr. 2013 | 7 |

It has been found from the above data (and also other data) that 14 or 15 pre- and postnatal weight measurements provide for an estimated birthing date of acceptable accuracy.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The invention claimed is:

1. A method, comprising:
   electronically identifying a mother animal, which is a member of an animal breeding program; and
   determining an estimated birthing date of the identified mother animal, by:
   measuring the weight of the mother animal using an electronic weighing platform configured to output weight in a processor-readable form at intervals over an expected birthing period to provide a series of processor-readable dated weight records,
   storing the series of processor-readable dated weight records for the mother animal in a processor-accessible memory, and
   for each record of the stored series of processor-readable dated weight records:
   (i) calculating by a processor an averaged or median weight of the mother animal over at least n computer-readable dated weight records preceding the date of the dated weight record,
   (ii) calculating by the processor an averaged or median weight of the mother animal over at least n computer-readable dated weight records following the date of the dated weight record, and
   (iii) calculating by the processor a weight difference between the averaged or median weights calculated at (i) and (ii).

2. The method of claim 1 comprising storing the calculated weight difference for each record of the stored series of computer-readable dated weight records in the processor-accessible memory, and by the processor comparing each of the weight differences for each record of the stored series of computer-readable dated weight records to identify a record which has the greatest calculated weight difference.

3. The method of claim 2 comprising outputting the date of the record which has the greatest calculated weight difference.

4. The method of claim 1 wherein each n of (i) and (ii) is greater than 5 and less than 20.

5. The method of claim 1 wherein the electronic weighing platform is physically inaccessible to an animal that has recently taken water.

6. The method of claim 1 wherein the electronic weighing platform is disposed in or about an entry to a yard, the yard having a water source disposed therein.

7. The method of claim 6 wherein the yard is substantially closed except for an entry-only gate and an exit-only gate and configured such that an animal must traverse the weighing platform so as to pass through the entry-only gate and access the water source.

8. The method of claim 7 wherein the yard is configured such that an animal that has passed through the entry-only gate and has traversed the weighing platform is incapable of traversing the weighing platform a second time until that animal exits the yard via the exit-only gate.

9. The method of claim 2 comprising calculating an estimated birth weight of a progeny animal by calculating the weight lost by the mother animal on or about the the date of the record having the greatest calculated weight difference.

10. A system for determining an estimated birthing date of a mother animal being a member of an animal breeding program, the system comprising a weighing platform configured to output weight of an animal in a processor-readable form and the weighting platform being physically inaccessible to an animal that has recently taken water.

11. The system of claim 10 wherein the weighing platform is disposed in or about an entry to a yard, the yard having a water source disposed therein.

12. The system of claim 11 wherein the yard is substantially closed except for an entry-only gate and an exit-only gate and configured such that an animal must traverse the weighing platform so as to pass through the entry-only gate and access the water source.

13. The system of claim 12 wherein the yard is configured such that an animal that has passed through the entry-only gate and has traversed the weighing platform is incapable of traversing the weighing platform a second time until the animal exits the yard via the exit-only gate.

* * * * *